Patented Feb. 26, 1946

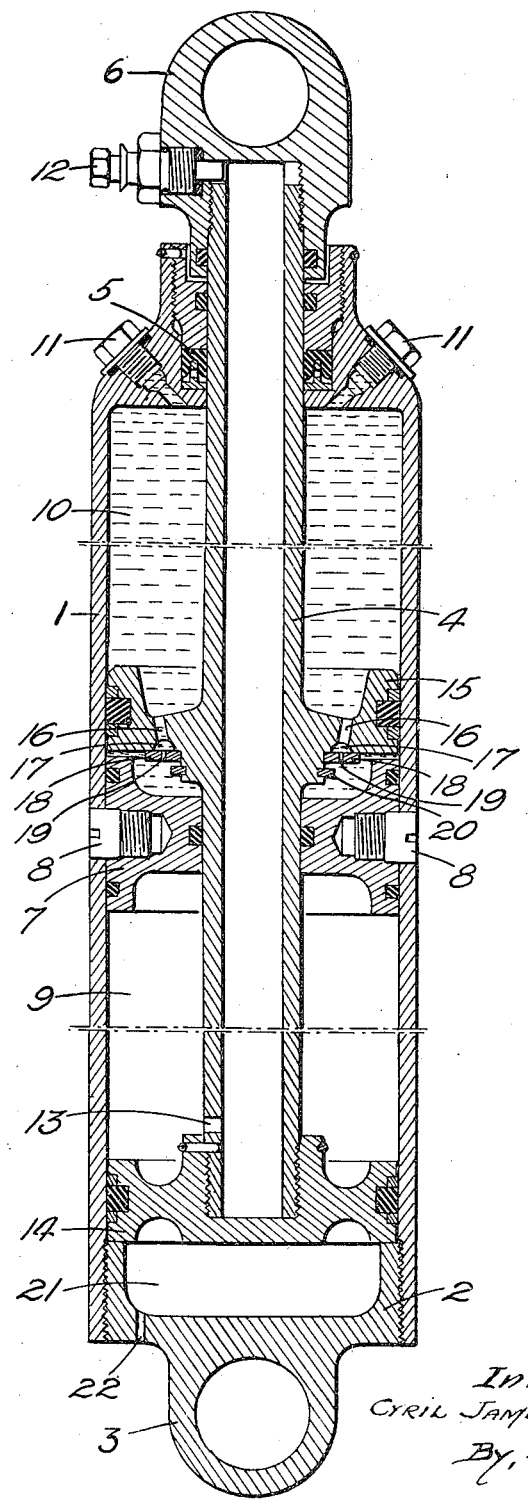

2,395,595

UNITED STATES PATENT OFFICE 2,395,595

RESILIENT UNIT FOR OPERATION IN TENSION

Cyril James Underwood, Cheltenham, England, assignor to Dowty Equipment Limited, Cheltenham, England Application November 23, 1943, Serial No. 511,467
In Great Britain November 17, 1942

3 Claims. (Cl. 267—64)

This invention is a resilient device operating in tension and embodying unitarily and in tandem therewith a damping unit operable to restrain the resilient device against excessively violent operation.

It is an object of the invention to provide a damped resiliently-extensible shock-absorber in which the resilience is effectively isolated from the damping unit; whereas the whole device is effectively embodied in a single unit complete in itself.

A further object of the invention is the provision of a telescopic resilient unit particularly effective for employment in aircraft and vehicle suspension systems, in which a resilient device operates in tension quite independently of a damping stage to restrain the plunger against excessively violent operation, especially in recoil on relief of tension load operating to extend the resilient device in a telescopic sense.

Another object of the invention is the provision of a satisfactory shock-absorber in oleo-pneumatic form, in which complete separation of the compressed air or other gas which provides the resilience from the liquid which provides for damping action is effectively achieved without the necessity for incorporating a floating piston.

A still further object of the present invention is the provision of an oleo-pneumatic shock-absorber, which by utilising space within the plunger which is formed hollow for the purpose increases the volume available for compressed air or other gas over that normally provided, and at the same time simplifies the introduction of the compressed air or other gas.

Yet a further object of the invention is the provision of an eminently practical form of damped resilient unit of very simple construction, in which fluid damping action is provided for quite independently of resilient operation in tension, which thus enables the resilient means to be selected at the designer's choice.

The manner of achievement of the above and other objects of the invention will become apparent from the ensuing description and the accompanying diagrammatic drawing, which is a sectional side elevation of a damped resilient unit resiliently resistant to loads operating in tension and embodying the essential features of the invention.

Referring now to the drawing, the reference numeral 1 indicates the outer chamber, preferably of cylindrical form, and which is closed at one end by means of a closure plug 2 embodying a pin-joint connection lug 3. The other end of the cylinder 1 is open, and the plunger 4 operates slidably in the gland fitting, generally indicated by the reference numeral 5. At its outer end the plunger 4 embodies a pin-joint lug fitting 6. For installation, the pin-joint fittings 3 and 6 are attached to the relatively sprung and unsprung elements of the suspension system or other means in which the resilient device is required to operate.

Approximately half-way along the cylinder in an axial sense a partition 7 is provided which is suitably packed and glanded, being located in any convenient manner, as for example by means of the fixing screws or bolts 8 engaged through the wall of the cylinder 1. The plunger 4 operates slidably through the partition 7, which is suitably glanded to prevent leakage, and the partition 7 thus operates to subdivide the cylinder 1 into a compartment 9 for housing the resilient means and a compartment 10 to enclose damping fluid, usually in the form of oil or other hydraulic fluid commonly employed in oleo-pneumatic shock-absorbers and damping devices generally.

In oleo-pneumatic types of shock-absorber the space 10 is filled with liquid through a filler plug 11. It will be noted that there are two filler plugs, and for filling purposes both may be removed so that one can serve to let air out of the damping fluid compartment 10, while the oil or other damping fluid is introduced through the other. The inflation chamber 9 is filled with air or gas at pressure, and in such cases it is convenient to form the plunger 4 hollow and to introduce the air or gas into the hollow plunger through the inflation valve 12, the hollow plunger being in communication with the inflation chamber 9 through a suitably-disposed port 13.

Within the inflation chamber 9 the plunger mounts a piston 14 which is suitably glanded for operation in the bore of the cylinder 1 and is secured to the plunger in any convenient manner. It will be realised that with the inflation chamber 9 at pressure approach of the piston 14 towards the partition 7 is resiliently resisted by the entrapped gas, so that the device operates to provide effective resilient resistance to loads operating in tension.

Immersed in the damping fluid within the space 10 is a damping head 15 which is formed integrally with the plunger, or at any rate locked against axial movement with respect thereto. The damping head preferably incorporates packing means so that it operates as a piston when moving with the plunger, causing fluid to be displaced from side to side of the head through fluid-flow ports 16 which communicate with the groove 17 on that face of the damping head directed towards the partition 7. A clack valve in the form of an annulus 18 is provided with flow-restriction ports 19 and operates with limited axial freedom between the clack valve stop ring 20 on the plunger and the adjacent face of the damping head 15. The arrangement is such that during extension movement of the plunger 4 with respect to the cylinder 1 under the influence of loads operating in tension, flow of damping fluid through the ports 16 causes a surge operating to lift the clack valve annulus 18 off the groove 17, so that in actual fact the plunger 4 operates for extension in response to tension loads almost entirely against pure resilience alone. On the other hand, when the damping head 15 is travelling towards the partition 7 the surge of liquid tends to close the clack valve annulus 18 against the groove 17, and thus to confine the flow of fluid to the flow-restriction orifices 19. It therefore follows that, whereas resilient yield of the device under the influence of tension loads occurs against substantially undamped resilient resistance, the recoil or restoration of the unit to its retracted form is appropriately damped.

To avoid subjecting the unit to any supplementary resilience or damping action, the space 21 is in communication with atmosphere through the port 22.

The construction provides an effective damped resilient unit in very simple form entirely devoid of any complicated internal mechanism; the hollow plunger 4 merely mounts the piston 14 and the damping head 15. The outer chamber 1 is in the form of a simple cylinder subdivided by the partition 7. Due to the fact that the plunger embodies no internal mechanism, its cross-section may be kept small, thereby making possible the provision of an inflation chamber 9 of large cross-section, which may be supplemented by the space available in the hollow plunger 4. The partition 7 provides for complete isolation of the damping fluid space 10 from the inflation chamber 9 so that the floating piston normally provided in preferred types of oleo-pneumatic shock-absorber becomes unnecessary. By reason of the fact that the damping head 15 and the piston 14 are movable directly with the plunger in both directions, it follows that the damping action is entirely dependent on plunger movement, and once initiated operates throughout the intended range over which damping is to be provided for.

The invention is not of course limited to oleo-pneumatic types of shock-absorber or like resilient devices, for it is obvious that the resilience instead of being provided by air or gas at pressure within the compartment 9 may be afforded by a spring or other resilient-compressible medium, or some combination of suitable resilient means.

What I claim is:

1. A resilient device comprising a tubular chamber one at one end, and partitioned intermediate its ends to define a liquid-filled damping compartment adjacent such open end, and an air-filled compression compartment isolated from the damping compartment adjacent its other end, a plunger closing the chamber's open end, and extending thereinto and through the damping compartment and partition into the compression compartment, a piston carried by said plunger within the compression compartment, spaced from and cooperating with the partition to retain air pressure therebetween, and thereby to urge the plunger into the chamber, and to resiliently resist extension, a damping head carried by said plunger within and subdividing the damping compartment, and damping means regulating passage of liquid between the opposite faces of said head, so arranged as to impose substantialy no resistance to extension of the resilient device as a whole, but to damp rebound retraction only.

2. A resilient device as in claim 1, wherein the damping head is ported, and valve means carried by said head and cooperating with said ports and urged towards closed position by rebound movement of the plunger, constitute the damping means to regulate retraction.

3. A resilient device comprising a tubular chamber open at one end, and partitioned intermediate its ends to define a liquid-filled damping compartment adjacent such open end, and a compression compartment filled with air under pressure adjacent its other end, a hollow plunger closing the chamber's open end, and extending thereinto and through the damping compartment and partition into the compression compartment, a piston carried by the plunger within the compression compartment, spaced from and cooperating with the partition to retain pressure therebetween, and thereby to urge the plunger into the chamber, and to resiliently resist extension, the plunger having a port affording communication between its hollow bore and said compression chamber, means at the protruding end of the plunger for regulating the pressure therein, a damping head carried by said plunger within and subdividing the damping compartment, and damping means regulating passage of liquid between the opposite faces of said head, so arranged as to impose minimum resistance to extension of the resilient device as a whole, but to damp rebound retraction.

CYRIL JAMES UNDERWOOD.